United States Patent [19]

Eberhard et al.

[11] Patent Number: 5,455,922
[45] Date of Patent: Oct. 3, 1995

[54] DYNAMIC VALIDITY FACILITY FOR FAST PURGING OF TRANSLATION BYPASS BUFFERS

[75] Inventors: Raymond J. Eberhard, Endicott; Douglas J. Goodin, Berkshire; Alfred T. Rundle, Jr., Endwell, all of N.Y.

[73] Assignee: International Business Machines Corporation, Armonk, N.Y.

[21] Appl. No.: 920,935

[22] Filed: Jul. 28, 1992

[51] Int. Cl.$^6$ .................................................. G06F 12/08
[52] U.S. Cl. .................................. 395/481; 364/DIG. 1; 364/281.7; 364/948.11; 364/955.2
[58] Field of Search ..................... 395/425, 400

[56] References Cited

U.S. PATENT DOCUMENTS

| | | | |
|---|---|---|---|
| 4,068,303 | 1/1978 | Morita | 395/400 |
| 4,463,420 | 7/1984 | Fletcher | 395/425 |
| 4,525,778 | 6/1985 | Carne | 395/425 |
| 4,695,950 | 9/1987 | Brand et al. | 395/400 |
| 4,718,008 | 1/1988 | Chang et al. | 395/425 |
| 4,792,895 | 12/1988 | Tallman | 395/375 |
| 4,849,881 | 7/1989 | Eguchi | 395/425 |

OTHER PUBLICATIONS

"IBM System/370 Exended Architecture—Interpretive Execution", Pub. #SA22–7095–1, IBM Corp., 1985.
"Cache Memories" by Alan Jay Smith, University of Calif. pp. 474–530, 1982.
IBM Technical Newsletter, #SN 22–5279, pp. 3–5 to D–5 Apr. 1989.
IBM Technical Newsletter, #SN 22–5342, pp. 1–1 to D–6 Dec. 1989.
"IBM Enterprise Systems Architecture/370—Principles of Operations", Pub. #SA22–7200–0, 1988.

*Primary Examiner*—Reba I. Elmore
*Attorney, Agent, or Firm*—Lynn L. Augspurger

[57] ABSTRACT

An address translation mechanism that allows for the creation, use, and purging of Translation Lookaside Buffer (TLB) entries associated to a unique task (virtual machine or guest). This association between guest and TLB entry allows for reuse of guest TLB entries (sets) in a multitasking system, quick purging of TLB entries during transition between address translation states, and quick restoration of control program TLB entries.

The address translation mechanism as described herein must contain, at a minimum, a translation lookaside buffer; each entry must contain, at least: a absolute address field, a virtual address field and a translation mode indicator (TMI); a guest TMI table having entries containing a unique identifier to a guest and an associated TMI value; and a TMI register that holds the currently valid TMI.

3 Claims, 1 Drawing Sheet

DYNAMIC VALIDITY FACILITY FOR FAST PURGING OF TRANSLATION BYPASS BUFFERS

FIELD OF THE INVENTION

This invention relates to computers and computer systems, and particularly to the management of Translation Lookaside Buffer (TLB) entries and how these are used and maintained.

GLOSSARY OF TERMS

While dictionary meanings are also implied by certain terms used here, the following glossary of some terms may be useful.

AA (Absolute Address) An address formed by performing address translation (vidual to real) followed by prefixing.

Guest An environment created by a control program that can be interleeved with other guests in a multitasking environment.

Microcode A code representing the instructions of an instruction set of a computer.

SD (State Descriptor) Storage block containing state information particular to a guest.

(State Descriptor Address) Address in storage of the state descriptor.

SIE Start Interpretive Execution.

TLB (Translation Lookaside Buffer) A high speed storage buffer used to store virtual to real address mappings and other associated translation control information.

Task A unit of work to be accomplished by a computer in a multitasking environment.

TMI (Translation Mode Identifier) An n-bit binary number assigned to a dispatched task which is used to associate TLB entries created during its execution.

VA (Virtual Address) An address of a location in vidual storage.

REFERENCES USED IN THE DISCUSSION OF THE INVENTION

During the detailed description which follows, the following works will be referenced as an aid for the reader. These additional references are:

IBM Corporation, The ESA/370 CPU Architecture, SA22-7200-0, 1989

IBM Corporation, System/370 Extended Architecture-Interpretive Execution, SA22-7095-1, September 1985

Smith, A. J., "Cache Memories," Computing Surveys, vol. 14, no. 3, pp 473–530, September 1982

BACKGROUND OF THE INVENTION

This invention shows how a TMI (Translation Mode Identifier) is used to selectively and quickly purge a TLB (Translation Lookaside Buffer), and how this technique is used to restore previously dispatched task's TLB entries via TMI matching. This lessens the number of overall TLB purges and improves performance. When a task is running, TLB entries associated with the task's TMI are used and created. When a task is no longer running the TLB entries associated with that task are not used. When the task is dispatched again, the TMI is restored and the TLB entries associated with this task are once again used. This unique task to TMI association allows less purging of the TLB.

In addition, we would note that there are publications and patents of which we are aware that are listed below, with a brief discussion of each of the publications and patents.

From U.S. Pat. No. 4,821,171 it may be appreciated that others have developed a code (which we will describe as a TMI-Translation Mode Identifier) associated with TLB entries. The code is for each switch to a new program, and the code has been assigned to each address translation created within the execution of the program. The code is updated to speed purging of translation buffers. This earlier patent does not illustrate how a code (our TMI) can be used in a multitasking environment to improve overall system performance while minimizing its cost to hardware as we will elaborate upon this in our detailed description.

Also, there are other patents dealing with TLB entries. U.S. Pat. No. 4,733,350 illustrates a method for purging a TLB by storing the affected addresses (those that need to be purged) in a purge register and provides for comparing these addresses to physical addresses from a TLB. However, this patent needs to store and subsequently compare physical addresses to identify those TLB entries that need to be purged.

U.S. Pat. No. 4,731,739 and U.S. Pat. No. 4,779,188 provide for fields in the TLB to store information, etc., but while these patents do have some relationship with a TLB, they have no particular relationship with our improvements.

SUMMARY OF THE INVENTION

Our invention provides a way to restore previously dispatched tasks' TLB entries and to quickly purge a TLB selectively in a multitasking environment.

This is achieved by assigning a TMI (Translation Mode Identifier) to a task and to entries stored in the TLB created while the task is active. A task's TLB entries are selectively restored by destining a TMI register—a register identifying those currently valid TLB entries—with a task's TMI. Likewise, a task's TLB entries are purged from the TLB by destining the TMI register with a TMI other than that assigned to the task.

The improvements we have made achieve an increase in overall system performance while minimizing the cost of our invention to hardware.

These improvements are accomplished by providing a field within each TLB entry to store its associated TMI, providing a TMI register used to store the currently valid TMI, providing microcode that assigns TMI's to a task and updating the validity register when appropriate, to restore or invalidate a task's TLB entries, and by providing a table that associates TMI values to tasks.

These and other improvements are set forth in the following detailed description. For a better understanding of the invention, with advantages and features, refer to the description and drawings.

Our detailed description explains the preferred embodiments of our invention, together with advantages and features, by way of example with reference to the following drawings.

DETAILED DESCRIPTION OF THE INVENTION

Before considering our preferred embodiments in detail, it may be worthwhile to discuss vidual addressing and the creation and purging of TLB entries.

Virtual addressing, which is used by most high performance processors today, provides a means for the operating system to efficiently manage main storage by allocating a contiguous virtual address space to a program. Virtual addresses within a virtual address space map to physical (absolute) addresses in main storage. The method for calculating the physical address of data in storage from a given virtual address is called Address Translation.

Typically, the algorithm used to translate a virtual address to an absolute address involves multiple calculations consuming tens of processor cycles to compute. This computation time is costly to processor performance since it lengthens the processor's access time to requested data. In a standard TSO MVS 3.1 trace (1.3 million S/390 instructions) there are over one million references to storage, each requiring a virtual-absolute address translation. Given both the high occurrence of references to storage and the number of cycles required to translate each virtual address, a lookaside buffer is used to decrease the impact of address translation on processor performance.

Figure 1:
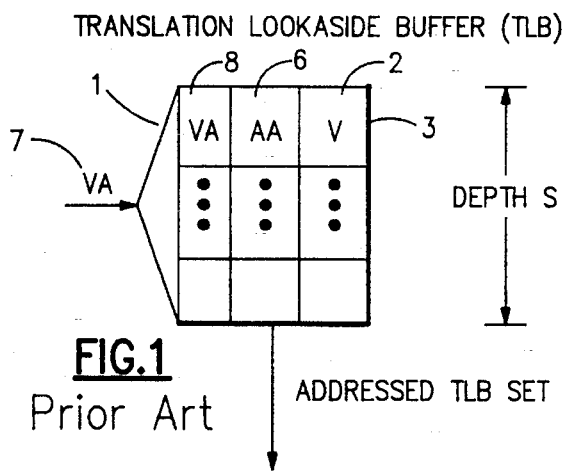
FIG. 1 shows schematically a conventional Translation Lookaside Buffer (TLB).

A Translation Lookaside Buffer (TLB) as shown in FIG. 1 is a high speed storage buffer used to store the corresponding absolute storage address (AA) for a previously translated virtual storage address (VA). Therefore, the TLB performs a single cycle address translation for those virtual addresses currently mapped in the TLB.

The residency of an absolute address in the TLB for a given virtual address is determined both by the presence of the same vidual address in the buffer, shown as VA of FIG. 1, and by its validity bit, V. If the validity bit indicates an invalid entry, the absolute address cannot be used to access physical storage even if the given virtual address matches the virtual address stored in the TLB. All entries in a TLB must be invalidated when the tables used in the translation process are changed. How often the translation mode changes and how many TLB entries need to be invalidated determines the overall busy time of the TLB (time when the TLB is not available to perform single cycle address translation). The busy time of the TLB is directly proportional to its depth S, which is the number of addressable sets, and the number of addressing mode changes that are performed by the operating system and the problem program.

When the content of a TLB is purged, each set of the TLB is addressed and its validity bit is reset. All entries subsequently added to a TLB result from a lengthy address translation. Should the need arise for an operating system or problem program to temporarily change addressing modes, such as from a primary mode to a temporary mode, it must first purge the entire content of its TLB (this may be performed by a system's microcode), change addressing modes, translate the temporary mode address, perform the operation and then purge the TLB again and return to primary mode. Program execution then continues from this point.

The time required to purge the TLB degrades processor performance; in addition, the loss of the primary mode TLB entries is costly because they must now be recalculated using the lengthy translation process if a storage reference is made to a previously purged TLB entry.

This invention dynamically redefines the validity of information stored in a lookaside buffer or any such similar device by way of a multi-bit validity indicator called the Translation Mode Identifier (TMI). The ability to temporarily invalidate control information and later establish its validity without having to recreate the information is useful for improving a processor's performance. Also, this method allows rapid invalidation of all control information stored in an array should this information become invalid due to the present or previous state of the processor.

The Preferred Embodiment

Figure 2:
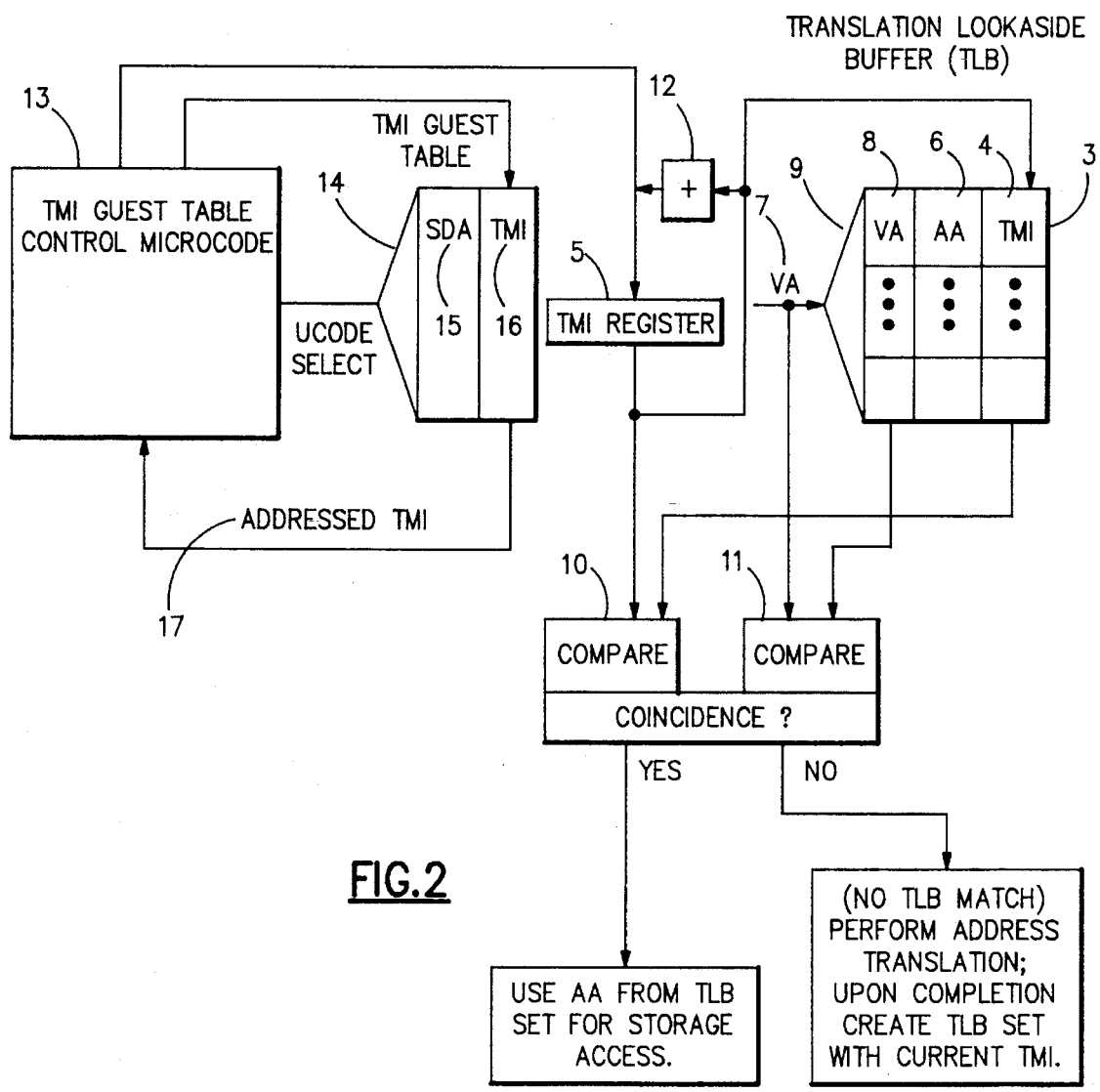
FIG. 2 shows schematically an overview of the preferred embodiment of this invention.

Turning now to our invention in greater detail, and in reference to FIG. 1, to reduce the number of machine cycles required to purge a conventional TLB 1, the valid bit (V) 2 registered in TLB set 3 is expanded into a facility of b bits (b>1), as shown in FIG. 2, called the Translation Mode Identification (TMI) 4. External to the TLB, TMI register 5 contains the current translation mode's TMI.

When a TLB set is produced by address translation, the resulting absolute address, AA 6, is registered to addressed set 3 (addressed by VA 7) along with the remaining portion of the virtual address, VA 8, which is not used to address set 3; the value of the TMI found in TMI register 5 is registered to said set.

When a TLB 9 is read, addressed set TMI 4 is compared in comparator 10 to TMI the register 5; virtual address bits, VA 7, of the virtual address not used to address TLB 9 are compared in comparator 11 to the corresponding virtual address bits, VA 8, registered in the addressed set of the TLB. Coincidence of the TMI's compared in 10 and also coincidence of address bits compared in 11 allow use of AA 6, the absolute address, obtained from the addressed TLB set 3 to access main storage. If mutual coincidence does not occur, a lengthy translation is performed which results in the creation of a new TLB set.

If the operating system or problem program elects to change the addressing mode, the entire contents of TLB 1 must be purged; each set of the TLB is addressed and its valid bit V 2 is set to its invalid state, requiring as many machine cycles to perform as there are sets. To effectively achieve this same result using the invention of the preferred embodiment, the value registered in TMI register 5 is incremented 12. By incrementing the TMI 12 to its next sequential value, the entire contents of the lookaside buffer is purged in zero cycles relative to the busy time of the TLB.

In this embodiment, a TMI is used such that multiple task's translation mappings are registered in the TLB 9 and are reused when appropriate. As tasks are dispatched, TMI guest table control microcode 13 searches the Guest/TMI Table 14, comparing the current State Descriptor Address (SDA) to those previously dispatched; coincidence identifies a previously dispatched task; the Guest/TMI table stores the unique State Descriptor Address (SDA) 15 assigned to each task when first dispatched and its corresponding TMI 16. If a task was not previously dispatched, coincidence is not obtained, and therefore an entry is added to table 14 including the task's SDA and the value of the TMI obtained from the TMI register 5, once incremented by 12. If upon a search of the table 14 coincidence occurs, the associated TMI is read 17 and then stored to the TMI register 5 by TMI guest table control microcode 13. This action reestablishes the validity of those sets in TLB 9 belonging to the subject task and precludes the need for these to be translated if subsequently referenced.

If increment 12 of TMI register 5 produces a carry-out from the most significant bit, each set 3 of TLB 9 is addressed and its TMI is set to zero. TMI register 5 is incremented once during this operation.

The performance improvement of the preferred embodiment measured in processor cycles for purging TLB 9 of depth S is given by:

$$OC = PT/(2^B - 1)$$
$$\text{Purge Savings (cycles)} = S \times (PT - OC)$$

Where: S=total number of sets in the TLB PT=total number of required TLB purges B=TMI width in bits OC=TMI Overflow cost (rounded down to the nearest whole number)

Performance improvement measured in processor cycles for restoring previously purged TLB entries is given by the following equation:

$$\text{Restore Savings} = \sum_{n=1}^{M} (R_n \times TC_n)$$

$R_n$=the number of TLB sets restored to operating mode n and subsequently used $TC_n$=processor cycles required to create information stored in each set n of the TLB during operating mode n M=total number of restores While we have described our preferred embodiments of our invention, it will be understood that those skilled in the art, both now and in the future, may make various improvements and enhancements that fall within the scope of the claims which follow. These claims should be construed to maintain the proper protection for the invention first disclosed.

What is claimed is:

1. A method for operating a translation lookaside buffer in a multitasking computer system having an operating system in which computer system absolute addresses stored in said translation lookaside buffer are valid for only certain tasks of said multi-tasking computer system comprising the steps of, assigning a multi-bit translation mode identifier that is unique to each of said certain tasks;

storing said unique multi-bit translation mode identifier in said translation lookaside buffer with a virtual address and absolute address calculated from said virtual addresses in an operation of a task to which said unique multi-bit translation mode identifier has been assigned;

when a task is running on said multi-tasking computer, storing said multi-task translation mode identifier assigned to said task in a register;

addressing said translation lookaside buffer with a virtual address;

comparing the multi-bit translation mode identifier at said virtual address addressed in said addressing step with said multi-task translation mode identifier stored in said register to determine the validity of a physical address corresponding to virtual address in said addressing step; and temporarily invalidating physical addressees associated with a translation mode identifier stored in said register by incrementing the multi-task translation mode identifier stored in said register by a predetermined value to redefine, by virtue of said incrementing, the validity of said absolute addresses stored in said translation lookaside buffer upon occurrence of a need by said operating system or said task running on said multi-tasking computer for a temporary change of addressing modes; and, when appropriate for a further return to a previous addressing mode after said temporary change of addressing modes, restoring said absolute addresses stored in said translation lookaside buffer to said value stored in said register by restoring said stored multi-task translation mode identifier assigned to said task in said register.

2. A method for operating a translation lookaside buffer as in claim 1, including the further steps of:

storing in a table an address for each task which has run on said multi-tasking computer along with its unique multi-task translation mode identifier;

searching said table when a task is to be run to determine if an address corresponding to an address for the task to be run resides in said table; and if said address corresponding to an address for which the task to be run resides in said table, transferring the unique multi-task translation mode identifier for said task to said register.

3. A method for operating a translation lookaside buffer as in claim 2, including the further step of assigning the incremented value of said multi-task translation mode identifier in said register to a task where said searching step fails to locate an address corresponding to an address for the task to be run.

\* \* \* \* \*